June 12, 1956 A. A. BARCO 2,750,438

COLOR TELEVISION RECEIVER

Filed Oct. 11, 1950 3 Sheets-Sheet 1

INVENTOR
Allen A. Barco
BY
ATTORNEY

INVENTOR
Allen A. Barco
BY
ATTORNEY

June 12, 1956 A. A. BARCO 2,750,438

COLOR TELEVISION RECEIVER

Filed Oct. 11, 1950 3 Sheets-Sheet 3

INVENTOR
Allen A. Barco
BY
[signature]
ATTORNEY

United States Patent Office 2,750,438

Patented June 12, 1956

2,750,438

COLOR TELEVISION RECEIVER

Allen A. Barco, Princeton, N. J., assignor to Radio Corporation of America, a corporation of Delaware Application October 11, 1950, Serial No. 189,506

12 Claims. (Cl. 178—5.4)

This invention relates to color television systems. It has particular reference to systems for receiving video signals transmitted according to the time division multiplex principle.

In a color television system operating in accordance with the time division multiplex principle, there is transmitted, as the modulation component of a carrier wave, a video signal wave having instantaneous amplitudes representing respectively the different color components of successive elemental areas of the image to be reproduced. Such a system forms the subject matter of a copending U. S. application of John Evans, Ser. No. 111,384 filed August 20, 1949 and titled, "Color Television." In order to reproduce an image from a video signal wave of such a character, it is necessary that the wave be sampled at suitable times. Previously, it has been considered that the video signal wave should be sampled coincidentally with the reception of the different instantaneous amplitudes thereof which represent the different component image colors. Accordingly, it has heretofore been considered necessary to employ a signal sampler for each of the component colors of the image to be reproduced.

It is evident that such an arrangement requires considerable apparatus. Consequently, the cost of producing such a receiver is appreciably increased. Also, because of the additional apparatus required, the cost of operation of the receiver is increased. Furthermore, a receiver of such a character requires the exercise of considerable skill in making the adjustments necessary for its successful operation.

Accordingly, it is an object of this invention to provide a video signal-receiving arrangement for a color television system operating in accordance with the time division multiplex principle wherein considerably less apparatus is used than has been heretofore necessary. Another object of the invention is to provide an improved time division multiplex signal-receiving system in which a smaller number of signal samplers is required than there are component signals.

Still another object of the invention is to provide an improved video signal-sampling system, whereby there may be derived video signals for use in reproducing an image substantially in its natural colors by means of a minimum amount of apparatus in addition to that required to receive a conventional black and white signal.

In accordance with this invention, the video signal wave sampling apparatus is used in conjunction with a conventional receiver of television signals. In this case the television signals are a wave having different instantaneous amplitudes representative respectively of the different color components of successive elemental areas of the image to be reproduced. The wave is sampled by suitable means to develop the individual component image color representative video signals. The sampling apparatus may consist, for example, of one or more devices operating essentially as valves or gates. The combined video signal wave is impressed continuously upon the sampling apparatus. The sampling apparatus, in turn, is operated for short intervals of time to transfer that portion of the video signal wave impressed thereon to a utilization circuit.

In the case of a conventional signal-receiving system, there is provided a signal sampler for each of the component image colors. The utilization circuit for each of the samplers includes image reproducing apparatus. As a result, the proper color signals are transferred to the corresponding reproducing apparatus. In the present case, however, there are fewer signal samplers provided than there are image colors. The sampling apparatus is operated at suitable times to derive, from the combined video signal wave, information representative of one or more of the image colors. The signal information produced by the sampling apparatus is utilized in the usual way to reproduce one or more of the component colors of the image. Also, it is employed in conjunction with the unsampled wave in a manner to produce another signal which is representative of an additional image color. For example, in a three color system in accordance with one illustrative embodiment of this invention, the combined video signal wave is sampled by two separate signal samplers. The information developed by the respective samplers is impressed upon two separate color reproducing elements. In addition, a portion of the signals developed by the two samplers is combined and subtracted from the unsampled wave to develop a third video signal sample representative of the third image color. This information is derived without the use of a separate sampling device. Once developed, it may be employed to operate a third reproducing element.

In accordance with another feature of the present invention, the combined video signal wave representing three image colors, for example, may be sampled to derive information regarding one of the color components. In addition to operating a reproducing element, the sampled portion may be subtracted from the combined unsampled signal to produce a second video signal. This second signal will be generally representative of a second image color. Finally, in such a system, the unsampled signal may be impressed directly upon a third reproducing element. The optical combination of the images produced by the three reproducing elements will provide a color image in which the different component colors are reproduced generally in accordance with the original subject.

Still another aspect of the invention is in the provision of a relatively inexpensive color television receiver for operation in a three-color television system. It previously has been proposed to sample the received combined video signal wave twice during each color cycle instead of three times. In this way, two mixed color components are derived. It has been found that a reasonably good color television image may be reproduced from such signals. One such system forms the subject matter of a copending U. S. application of G. C. Sziklai, Ser. No. 261,187, filed December 12, 1951 and titled "Color Television Reproducing System."

In accordance with the present invention, the combined video signal wave is sampled once during each color cycle. The time at which the sampling is effected is controlled in a manner to produce a video signal representative of a mixture of two of the three colors. The mixed signal so derived then is subtracted from the combined unsampled video signal wave to produce a second signal representative of a different mixture of two of the three component image colors. The two mixed video signals produced in this manner are employed to control the operation of image-reproducing apparatus whereby to develop a two-color television image.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings, in which:

Figure 1:
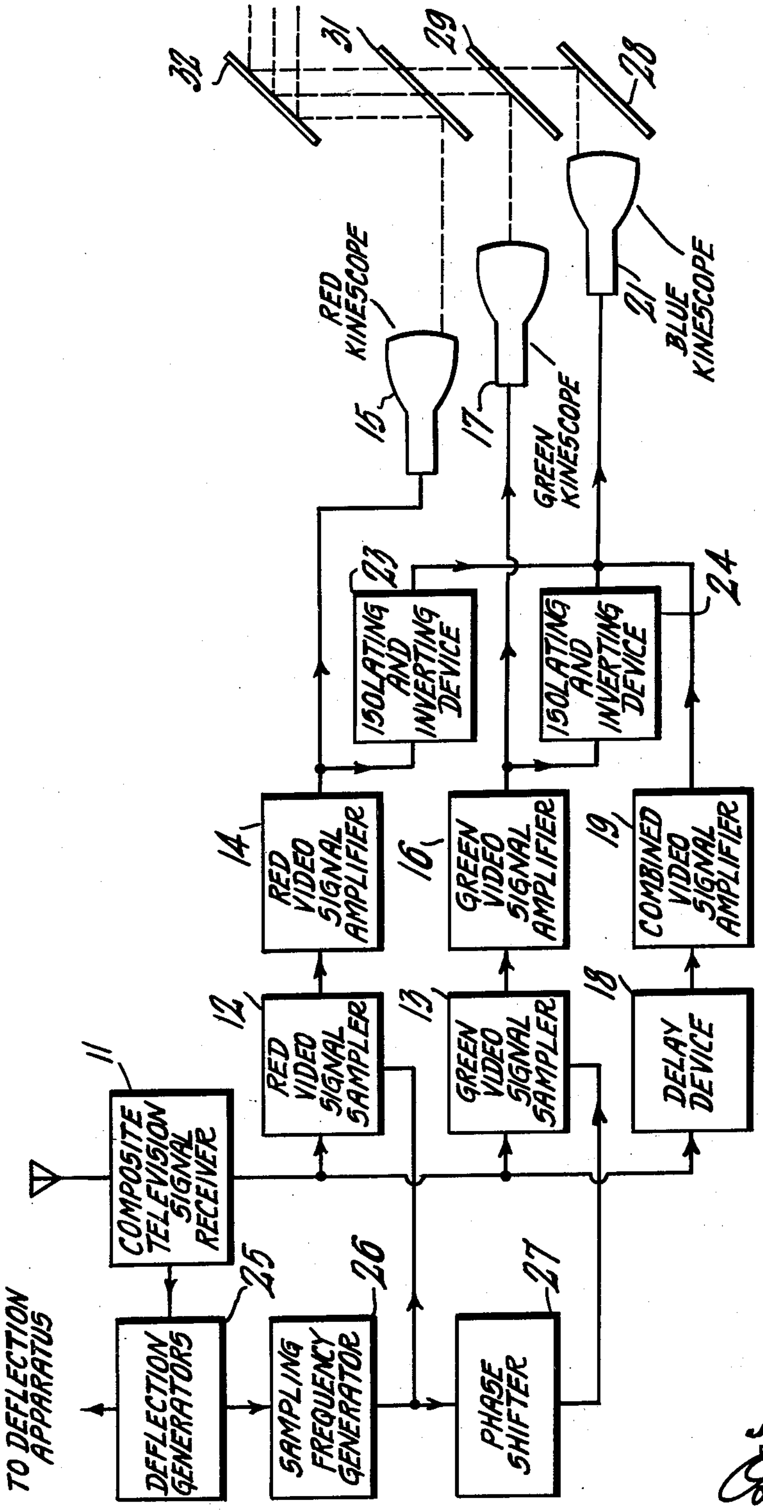
Figure 1 is a block diagram of one illustrative embodiment of the invention.

Reference first will be made to Figure 1 of the drawings. The embodiment of the invention represented in this figure is assumed to be part of a system for reproducing an image in three component colors. As in most systems of this character the colors are assumed to be red, green, and blue. The receiving system includes a conventional composite television receiver 11. This apparatus will be understood to include the usual radio frequency amplifier, frequency converter or first detector, intermediate frequency amplifier and second or signal detector. For the purpose of the present description, it will be further assumed that the receiver 11 also includes the usual apparatus for separating the video signal component from the synchronizing signal component. The video signal wave derived from the receiver 11 will be understood to be modulated in amplitude so that the different instantaneous amplitudes represent respectively the different color components of successive elemental areas of the image. Such a signal is of the type produced in a time division multiplex system. It is unnecessary to consider in detail the manner in which such a signal is produced in order to understand this invention. One way of developing such a signal is disclosed in the copending Evans application referred to. Other representative systems of this character form the subject matter of a copending U. S. application of Clarence W. Hansell, Ser. No. 124,034, filed October 28, 1949 and titled "Color Transmission System" and also a copending U. S. application of William D. Houghton, Ser. No. 157,148, filed April 20, 1950 and titled, "Color Television System."

The combined video signal wave derived from the receiver 11 is impressed upon three separate signal-conveying channels, one for each of the component image colors. In two of these channels the combined wave is separately sampled. Accordingly, the output circuit of the receiver 11 is coupled to the input circuit of a red video signal sampler 12 and also to a green video signal sampler 13. In essence, the signal samplers illustratively disclosed are gating devices and may be of conventional design. Typical examples of signal samplers suitable for such a purpose are disclosed in the copending Evans and Houghton applications referred to. Another example of a sampler which may be used is described in a paper titled "A 15 by 20-Inch Projection Receiver for the RCA Color Television System" published October 1949 by Radio Corporation of America, with particular reference to Fig. 9 and the related description on page 8. Normally, the signal samplers 12 and 13 are inoperative for the transfer of video signals to their respective output circuits. They are rendered operative periodically in response to a control signal derived from a suitable timing device. Therefore, they function to transfer to their respective output circuits only those video signal components which are impressed upon their input circuits at the instant at which they are rendered operative.

The red video signal sampler 12 is coupled to a red video signal amplifier 14. This device also may be entirely conventional. However, in view of possible signal transmission losses which may be encountered in the signal sampler, the video signal amplifier may include one or more stages in addition to the usual number. The output circuit of the red video signal amplifier 14 is coupled conventionally to the intensity-controlling electrode system of a red image-reproducing device, such as a kinescope 15. It will be understood that the kinescope 15 may be provided with a luminescen screen which, when excited by an electron beam, produces a red image. Alternatively, the kinescope 15 may be a conventional black and white tube. In such a case, a suitable red-passing filter will be interposed between the luminescent screen and the observer.

In a similar manner, the green signal sampler 13 is coupled to a green video signal amplifier 16. This amplifier, in turn, is coupled to a green kinescope 17.

The blue video signal channel of the receiver, in accordance with this invention, does not include a signal sampler. Instead, the video signal output circuit of the receiver 11 may be coupled to a delay device 18. This apparatus may consist of any conventional network or transmission line having the property of delaying the propagation of video signals therethrough for a predetermined time. In the present instance, the purpose of providing the delay device 18 is to compensate for any signal delay which may be encountered in the signal samplers 12 and 13. It will be understood that, if the samplers are of such design that no significant signal delay is produced thereby, the delay device 18 may be eliminated. The delay device is coupled to a video signal amplifier 19 which functions to amplify the combined video signal wave. Accordingly, in the output circuit of the amplifier 19, there will be reproduced the combined video signal wave. This wave, however, is modified, subsequently, in accordance with the present invention in a manner to be described presently. For the moment, however, it is to be noted that the output circuit of the amplifier 19 is coupled to the control circuit of a blue kinescope 21.

In accordance with one of the features of the invention, the output circuit of the red video signal amplifier 14 is coupled through an isolating and inverting device 23 to the output circuit of the combined video signal amplifier 19. In a substantially similar manner, the output circuit of the green video signal amplifier 16 also is coupled through an isolating and inverting device 24 to the output circuit of the amplifier 19. The isolating and inverting devices 23 and 24 may be conventional apparatus, one illustrative form of which will be described subsequently. Essentially, each of these devices functions to derive a predetermined portion of the video signal energy developed in the respective output circuits of the amplifiers 14 and 16 and to combine it suitably with the combined video signal wave developed in the output circuit of the amplifier 19. In order that the combined video signal wave produced in the output circuit of the amplifier 19 be prevented from mixing with the signal energy present in the output circuits of the amplifiers 14 and 16, it is necessary that the devices 23 and 24 be capable of suitably isolating these circuits. In other words, these devices are required to transfer energy in one direction only. In addition to the isolating function of the devices 23 and 24, it is necessary that they impress the red and green video signals upon the output circuit of the amplifier 19 in opposite polarity to that of the combined video signal wave.

It will be seen, therefore, that the red and green video signal components are effectively subtracted from the combined video signal developed in the output circuit of the amplifier 19. The remainder is substantially the blue video signal component which is suitable for impression upon the kinescope 21.

The receiving system also includes the necessary deflection generators 25 which are coupled for control to the synchronizing signal output circuit of the receiver 11. As indicated, these generators are coupled to the image-reproducing apparatus to control the scanning of the conventional television raster at the luminescent screens thereof. In addition, the deflection generators 25 also are coupled to a sampling frequency generator 26. This apparatus as more fully disclosed in the copending Evans application referred to, may consist of a sine wave oscillator operating at the sampling frequency. The oscillator also must be capable of being controlled by the synchronizing signal pulses of the received composite television signal. A suitable form of such an oscillator is disclosed in the book titled "Waveforms," published by McGraw-Hill Book Co., Inc., New York, at page 143, Figs. 4–45.

In the present case, the output circuit of the sampling frequency generator 26 is coupled to the control circuit of the red video signal sampler 12 as, for example, disclosed in the RCA publication previously referred to. Accordingly, once during each cycle of operation of the sampling frequency generator, the red sampler is rendered operative to transfer the red component of the combined video signal to the red amplifier 14.

In order to time properly the operation of the green video signal sampler 13, the output circuit of the sampling generator 26 also is coupled to the control circuit of the green sampler 13 through a phase shifter 27. In the assumed case of a three-color system, the phase shifter is required to change the phase of the control wave impressed upon the green sampler 13 so that it differs from the control wave for the red sampler 12 by substantially 120 electrical degrees.

The different color component images produced upon the luminescent screens of the red, blue and green kinescopes 15, 17 and 21, respectively, may be suitably combined by an optical system so that they may be simultaneously viewed substantially in exact register with one another. Substantially any desired type of optical system may be employed. For example, the blue image derived from the kinescope 21 may be reflected upwardly by a mirror 28. The green image from the kinescope 17 also may be directed upwardly by a color-selective device such as a dichroic deflector 29. This device also is a conventional element. A typical example of such a device is disclosed in U. S. Patent No. 2,420,168, granted May 6, 1947 to G. L. Dimmick and titled "Achromatic Light Reflecting and Transmitting Film." It has the property of reflecting green light and also the property of transmitting blue light, without substantial loss. Accordingly, the blue reflected image is transmitted through the dichroic reflector 29. Similarly, there is provided a dichroic reflector 31 in position to reflect red light from the kinescope 15 and also to transmit green and blue light from the kinescope 17 and 21, respectively. Finally, there may be provided a reflector 32 in a position to intercept light from all three of the kinescopes and to direct it, either onto a viewing screen, or directly to an observer.

Figures 2, 3:
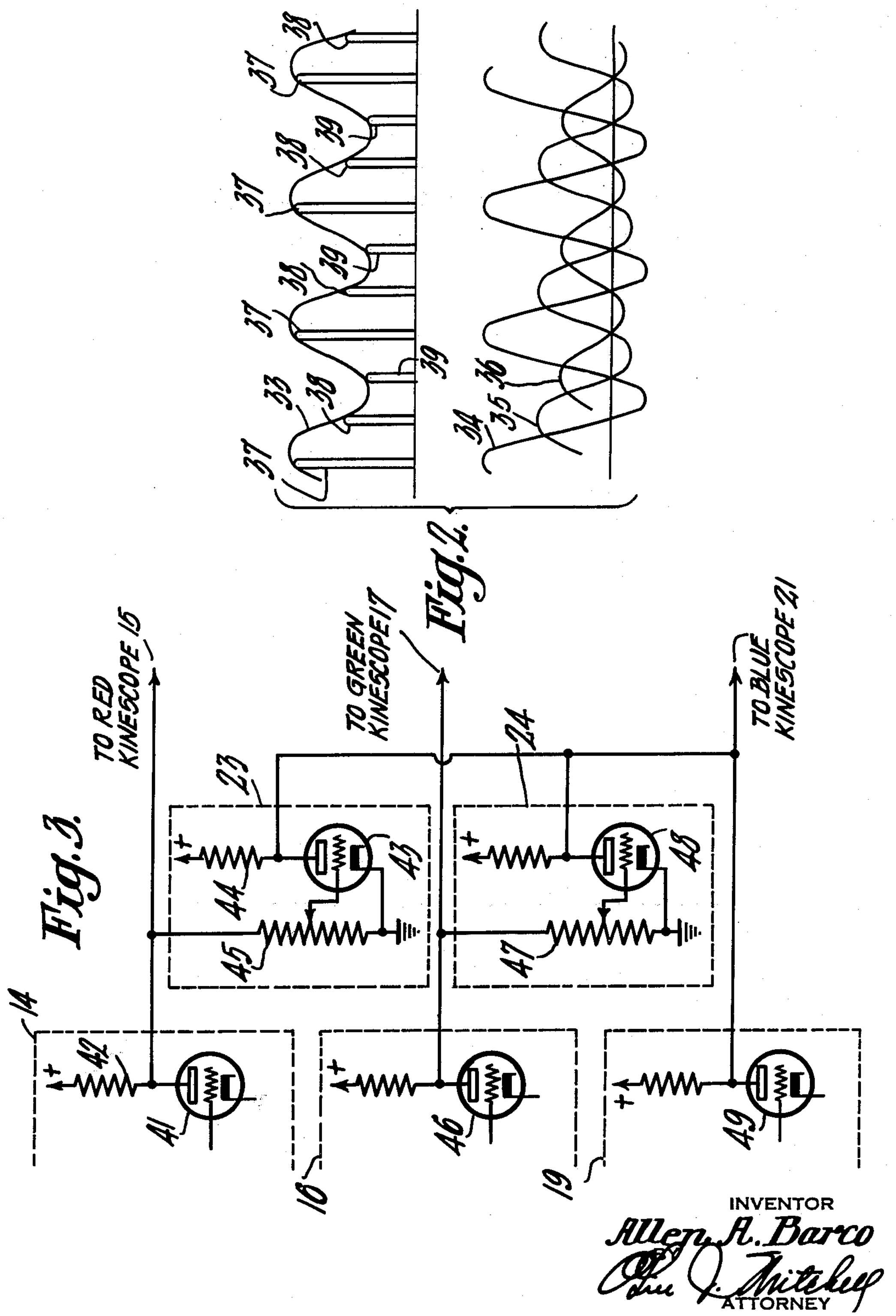
Figure 2 shows wave forms of typical video signals employed in a color television system of the time division multiplex type.
Figure 3 is a fragmentary circuit diagram showing representative details of one part of the system of Figure 1.

A brief consideration of the wave forms of Figure 2 will enable a better comprehension of the manner in which the present invention operates. The curve 33 is a typical combined video signal wave in a time division multiplex color television system. It is seen that the curve 33 is essentially sinusoidal in form. Its frequency corresponds to the sampling frequency. The curve 33, however, is a composite wave formed of three different sine wave components. Each of the component waves represents one of the three assumed component colors of the image. In this case, the individual color-representative waves comprise green, red and blue components 34, 35 and 36, respectively. It is assumed that the green component image color has the greatest intensity, the red, an intermediate intensity and the blue a relatively small intensity. The color intensities are represented by the respective amplitudes of the component waves 34, 35 and 36.

It will be noted that all of the component color video signal waves are substantially sinusoidal and have the same frequency as that of the composite wave 33. Aside from varying amplitudes, the component color video signal waves are distinguished from one another in phase. This distinction is a result of the sampling process. This may be demonstrated by means of the relatively narrow pulses representing the three-color content of three successive elemental image areas. The green impulses or samples 37 are seen to coincide with positive peaks of the green component wave 34. In a like manner, the pulses 38 represent the red color content of the same three successive elemental image areas. In turn, they coincide with positive peaks of the red component color video wave 35. The pulses 39 represent the blue color content of these image areas and coincide with positive peaks of the blue component video wave 36.

Thus, it may be seen, with reference to Figure 2, that the combined video signal wave 33 may be analyzed into its constituent waves 34, 35 and 36. It also should be evident that, having derived from the combined wave 33 signal energy which may be represented as the combination of the green and red component waves 34 and 35, the subtraction of these two waves from the combined wave 33 will produce substantially the blue component wave 36. It also may be seen that the time relations between the various component video signal waves is an important feature. Consequently, the provision of a delay device 18 in the system of Figure 1 may be found necessary in order to provide the required time relationship between the signals combined in the output circuit of the amplifier 19.

A reference to Figure 3 of the drawings will now be made to illustrate one way in which the combination of the two signal samples and their subtraction from the unsampled wave may be effected. The electron tube 41 represents the output stage of the red video signal amplifier 14. The red video signal is developed at the anode of this tube which is connected through a load resistor 42 to a positive voltage source. As indicated, this output stage is coupled to the red kinescope 15 of Figure 1.

The output amplifier stage including the tube 41 also is coupled to the isolating and inverting device 23. This apparatus may include an electron tube 43, the cathode of which is shown grounded and the anode of which is coupled through a load resistor 44 to a source of positive voltage. The control grid of the tube 43 is coupled to a voltage divider 45, the terminals of which are connected to the anode of the output amplifier tube 41 and to ground, respectively. It will be understood that the tube 43, preferably, will be provided with suitable biasing in a conventional manner to cause operation of the tube along the desired portion of its characteristic curve and to minimize power drain. By virture of the unilaterally conducting property of the tube 43, it is seen that suitable isolation is provided between the output circuit of the amplifier tube 41 and the anode of the tube 43. Furthermore, it is seen that the tube 43 also serves to invert the polarity of the red video signal derived from the amplifier tube 41.

In a similar manner the green video signal amplifier 16 also includes an output stage comprising an electron tube 46. The anode of this tube, in addition to being coupled to the green kinescope 17, is coupled to a voltage divider 47. The voltage divider forms part of the isolating and inverting device 24 which also includes an electron tube 48. As indicated above in connection with tube 43, tube 48 should also be appropriately biased.

The output stage of the combined video signal amplifier 19 also is represented as including an electron tube 49, the anode of which is coupled to the blue kinescope 21. Also, the output circuits of the isolating and inverting devices 23 and 24 derived respectively from the anodes of the tubes 43 and 48 are coupled to the anode of the tube 49.

If it is assumed that the red and green samplers 12 and 13 of Figure 1 do not invert the video signals and also that the amplifiers 14, 16 and 19 comprise a like number of stages, it is seen that the polarity of the video signals developed at the anodes of the tubes 41, 46, and 49, respectively, are alike. Consequently, since the devices 23 and 24 serve to invert the polarity of the red and green video signals, they are impressed upon the output circuit of the amplifier 19 in a polarity opposite to that in which the combined video signals are developed. Therefore, the red and green video signals are effectively subtracted from the combined video signal. Suitable adjustments of the voltage dividers 45 and 47 enable the red and green video signals to be impressed upon the output circuit of the amplifier 19 in suitable magnitudes to be effectively cancelled or subtracted from the combined signal. Accordingly, there remains of the combined signal, for impression of the blue kinescope 21, only the blue video signal component.

The principles of the present invention also may be embodied in other modifications of color television image-reproducing apparatus. One such embodiment of the invention is disclosed in Figure 4, to which reference now will be made. In this case the combined video signal wave representing the three component colors is received in the usual way by the composite television receiver 11. In this type of apparatus, only a single sampler is provided. For illustrative purposes it will be considered that only the red video signal sampler 12 is coupled to the receiver 11. It will be understood that the sampler is controlled in a suitable manner such as shown in Figure 1 so that only the red video signal component is reproduced in the output circuit thereof. The sampler 12 is coupled to the amplifier 14 for impression of the red video signal upon suitable image-reproducing apparatus. There is additionally provided a red video signal subtractor 51 having input circuit facilities for coupling both to the output circuit of the red sampler 12 and to the video signal output circuit of the receiver 11. The subtractor 51 may be similar to the isolating and inverting devices 23 and 24 of Figure 1. Alternatively, other devices of a similar character may be employed if desired. In any case, there is produced in the output circuit of the red video signal subtractor 51, a video signal which will be called the green video signal component. It will be apparent that this video signal will not represent the true green color content of the image. However, it will be found to approximate it to a reasonable degree. The output circuit of the subtractor 51, therefore, is coupled to the green video signal amplifier 16 for impression upon the green image-reproducing apparatus.

Finally, in accordance with this form of the invention, the combined video signal derived from the receiver 11 in unsampled form is amplified by the combined video signal amplifier 19 for impression upon the blue image-reproducing apparatus.

Figures 4, 5:
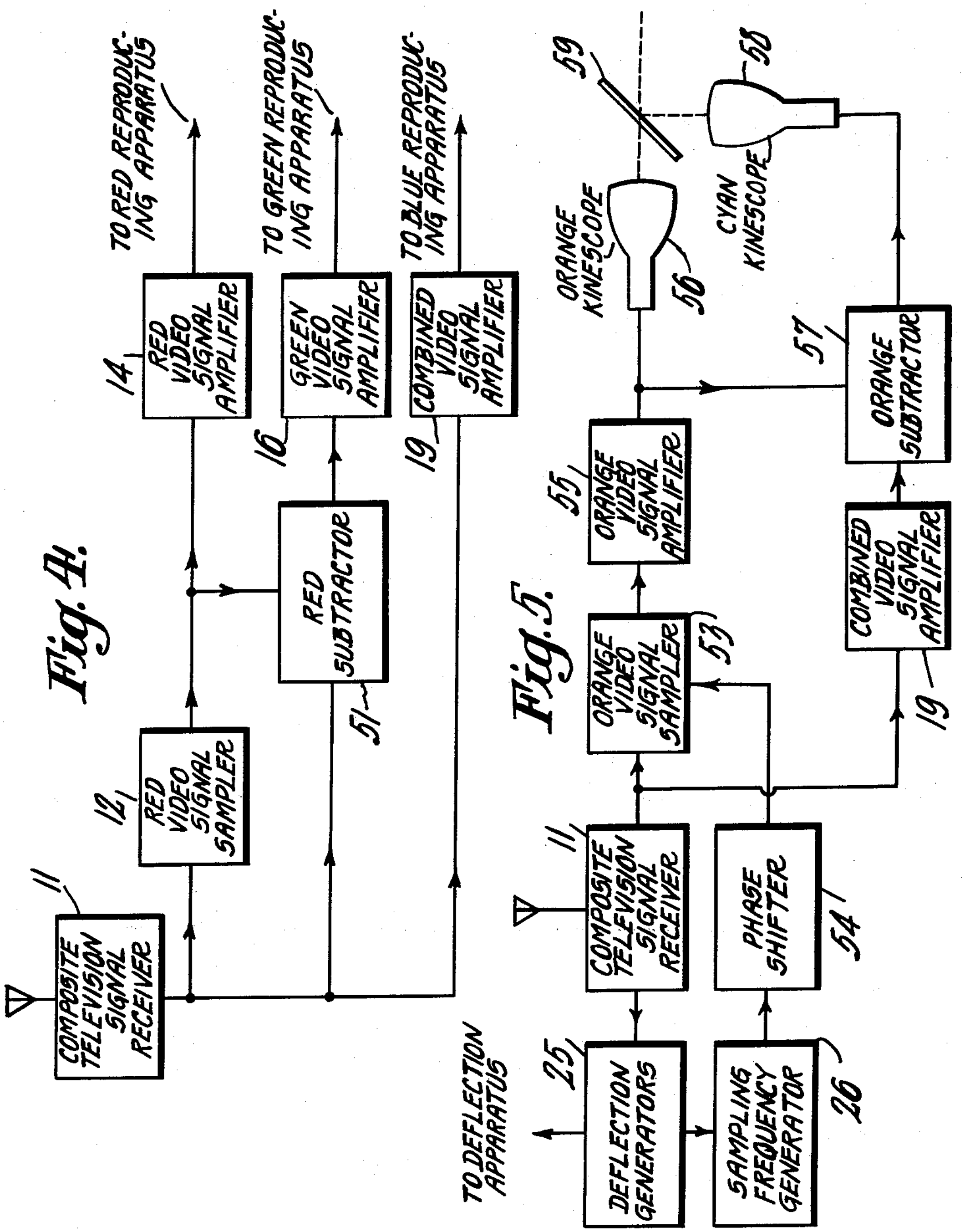
Figure 4 is a block diagram illustrating another embodiment of the invention.
Figure 5 is another block diagram showing still another embodiment of the invention.

It will be evident, of course, that an arrangement of the character described as shown in Figure 4 will not enable the reproduction of a color television image with a maximum of color fidelity. However, even with somewhat restricted color fidelity, such an image has considerable entertainment value. A receiver of the character embodying this form of the invention may be produced at a relatively small additional cost over that of a conventional black and white receiver. Accordingly, it is evident that there will be a considerable demand for relatively inexpensive color television receivers where maximum color fidelity is not required.

Still another form in which the present invention may be embodied is in a relatively low cost type of receiver for reproducing an image in two colors from a three-color video signal wave. One such type of receiver forms the subject matter of a copending U. S. application of G. C. Sziklai previously referred to. Figure 5 of the drawings, to which reference now will be made, shows an embodiment of the invention which may be employed with the type of color television receiver shown in the copending Sziklai application. The substance of the Sziklai application is to sample the received combined video signal wave twice during each color cycle instead of three times. These two samples are taken between the times of occurrence of the instantaneous wave amplitudes representing the true colors of the image. If a sample is taken between the red and green intervals, a signal representing an orange color of the image will be derived. Similarly, a sample of the combined video signal wave taken between the green and blue intervals produces a signal representative of a cyan color.

Accordingly, in Figure 5 the composite television receiver 11 is coupled to an orange video signal sampler 53. The operation of this sampler is timed by means of a wave derived from the sampling frequency generator 26 and impressed upon the control circuit of the sampler through a phase shifter 54. The output of the sampler 53 is coupled through an orange video signal amplifier 55 for impression upon an orange kinescope 56 or other suitable image-reproducing device. The unsampled combined video signal wave derived from the receiver 11 also is amplified by the amplifier 19. The output circuit of this amplifier is coupled, together with a branch circuit derived from the output circuit of the orange amplifier 55, to an orange video signal subtractor 57. The output of the subtractor is coupled to a cyan kinescope 58.

The luminescent screens of the kinescopes 56 and 58 are combined by suitable optical means which may include a dichroic reflector 59.

The operation of the two-color reproducing apparatus of Figure 5 will be readily understood, having reference to the manner in which other embodiments of the invention operate and particularly with reference to the phase relationships of the components video signal waves shown in Figure 2. If it be assumed that the phase shifter 54 is adjusted to render the orange signal sampler 53 operative at a time substantially 60 electrical degrees later than the time of reception of the red video signal, it may be seen from Figure 2 that the combined video signal wave 33 is sampled substantially coincidentally with the intersection of the green and red component waves 34 and 35. Thus, the sample taken will contain both red and green video signal information which combine to make orange. By subtracting the orange signal from the combined unsampled video signal, it is seen that the resultant is a mixture of the green and blue component signal waves which combine to make cyan.

Here again it is recognized that the image reproduced in such a manner will not have maximum color fidelity. However, such a picture does have considerable entertainment value which, in view of the relatively low cost at which such receivers may be reproduced, make such apparatus desirable.

It is seen that considerable simplification of a color television receiver may be effected by means of the present invention. Some of this simplification is a result of the use of a smaller number of signal samplers than there are video signal components to be derived.

It will be understood that the types of sampling apparatus disclosed herein are merely illustrative of the class of apparatus by which the individual signal components may be extracted from the combined video signal wave. Any other equivalent sampling apparatus may be used within the scope of the invention. Similarly, the sampling frequency generator need not necessarily be of the particular kind specified. The details of such apparatus are not part of the present invention and it is not contemplated that the invention be limited to any particular apparatus of the type referred to.

It will also be understood that, although three separate color kinescopes are shown in Figure 1 and described herein, the present invention is also equally applicable to a color television receiver wherein a single multicolor kinescope is used employing a plurality of electron beam sources and a single color screen.

Having disclosed a number of illustrative embodiments of the invention, the scope of the invention is set forth in the following claims:

What is claimed is:

1. In a color television image-reproducing system, means for receiving a composite video signal wave having components representative respectively of a plurality of different colors of successive elemental areas of the image to be reproduced, all of said wave components having the same frequency and mutually distinct phases, means operating in a particular phase relationship to said received wave for extracting from said received wave video signals representative of at least one of said image colors, means for subtracting said extracted video signals from said received wave to produce other video signals representative of at least one other of said image colors, and image-reproducing apparatus responsive to said color representative video signals for reproducing said image substantially in its natural colors.

2. In a color television image-reproducing system, means for receiving a composite video signal wave having components representative respectively of a plurality of different colors of successive elemental areas of the image to be reproduced, all of said wave components having the same frequency and mutually distinct phases, means operating in mutually different phase relationships to said received wave for extracting from said received wave video signals representative of more than one of said image colors, means for subtracting said extracted video signals from said received wave to produce other video signals representative of at least one other of said image colors, and image-reproducing apparatus responsive to said color representative video signals for reproducing said image substantially in its natural colors.

3. In a color television image-reproducing system, means for receiving a composite video signal wave having components representative respectively of a plurality of different colors of successive elemental areas of the image to be reproduced, all of said wave components having the same frequency and mutually distinct phases, means operating in mutually different phase relationships to said received wave for extracting from said received wave video signals representative of all but one of said image colors, means for subtracting said extracted video signals from said received wave to produce other video signals representative of the other one of said image colors, and image-reproducing apparatus responsive to said color representative video signals for reproducing said image substantially in its natural colors.

4. In a color television image-reproducing system, means for receiving a composite video signal wave having components representative respectively of three different colors of successive elemental areas of the image to be reproduced, all of said wave components having the same frequency and mutually distinct phases, means operating in two mutually different phase relationships to said received wave for extracting from said received wave video signals representative of two of said image colors, means for subtracting said two extracted video signals from said received wave to produce other video signals representative of the third of said image colors, and image-reproducing apparatus responsive to said color representative video signals for reproducing said image substantially in its natural colors.

5. In a color television image-reproducing system, means for receiving a composite video signal wave having components representative respectively of a plurality of different colors of successive elemental areas of the image to be reproduced, all of said wave components having the same frequency and mutually distinct phases, means operating in a particular phase relationship to said received wave for extracting from said received wave video signals representative of at least one of said image colors, means for subtracting said extracted video signals from said received wave to produce other video signals representative of at least one other of said image colors, image-reproducing apparatus, and means for impressing said extracted video signals, said video signals produced by said subtracting means and said composite video signal wave upon said image-reproducing apparatus for reproducing said image substantially in its natural colors.

6. In a color television image-reproducing system, means for receiving a composite video signal wave having components representative respectively of three different colors of successive elemental areas of the image to be reproduced, all of said wave components having the same frequency and mutually distinct phases, means operating in a particular phase relationship to said received wave for extracting from said received wave video signals representative of one of said image colors, means for subtracting said extracted video signals from said received wave to produce other video signals representative of at least one other of said image colors, image-reproducing apparatus, and means for impressing said extracted video signals, said video signals produced by said subtracting means and said composite video signal wave upon said image-reproducing apparatus for reproducing said image substantially in its natural colors.

7. In a color television image-reproducing system, means for receiving a composite video signal wave having components representative respectively of a plurality of different colors of successive elemental areas of the image to be reproduced, all of said wave components having the same frequency and mutually distinct phases, means operating in a particular phase relationship to said received wave for extracting from said received wave video signals representative of a combination of several of said image colors, means for subtracting said extracted video signals from said received wave to produce other video signals representative of another combination of several of said image colors, and image-reproducing apparatus responsive to said color representative video signals for reproducing said image substantially in its natural colors.

8. In a color television image-reproducing system, means for receiving a composite video signal wave having components representative respectively of three different colors of successive elemental areas of the image to be reproduced, all of said wave components having the same frequency and mutually distinct phases, means operating in a particular phase relationship to said received wave for extracting from said received wave video signals representative of a combination of two of said image colors, means for subtracting said extracted video signals from said received wave to produce other video signals representative of another combination of two of said image colors, and image-reproducing apparatus responsive to said color representative video signals for reproducing said image substantially in its natural colors.

9. In a color television image-reproducing system, means for receiving a video signal wave having instantaneous amplitudes representative respectively of a plurality of color components of successive elemental areas of the image to be reproduced, means including a video signal sampler coupled to said receiving means and operative periodically in a manner to derive from said received wave a video signal component representative of a component color of said image, means coupling the output of said sampler and the output of said receiving means in a manner to subtract said derived video signal component from said received wave, thereby producing a different video signal component representative of another component color of said image, and means including image-reproducing apparatus responsive to said video signal components for reproducing said image substantially in its natural colors.

10. In a color television image-reproducing system, means for receiving a video signal wave having instantaneous amplitudes representative respectively of a plurality of the color components of successive elemental areas of the image to be reproduced, means including video signal sampling apparatus coupled to said receiving means and operative periodically in a manner to derive from said received wave video signal components representative respectively of two of said plurality of component image colors, means coupling the output of said sampling apparatus and the output of said receiving means in a manner to subtract said two derived video signal components from said received wave, thereby producing another video signal component representative of another component color of said image, and means including image-reproducing apparatus responsive, respectively, to said video signal components for reproducing said image substantially in its natural colors.

11. In a color television image-reproducing system, means for receiving a video signal wave having instantaneous amplitudes representative respectively of a plurality of the color components of successive elemental areas of the image to be reproduced, means including video signal sampling apparatus coupled to said receiving means and operative periodically in a manner to derive from said received wave video signal components representative respectively of all but one of said plurality of component image colors, means coupling the output of said sampling apparatus and the output of said receiving means in a manner to subtract said derived video signal components from said received wave, thereby producing a video signal component representative of the other one of said plurality of component image colors, and means including image-reproducing apparatus responsive, respectively, to said video signal components for reproducing said image substantially in its natural colors.

12. In a color television image-reproducing system, means for receiving a video signal wave having instantaneous amplitudes representative respectively of a plurality of the color components of successive elemental areas of the image to be reproduced, means including video signal sampling apparatus coupled to said receiving means and operative periodically in a manner to derive from said received wave video signal components representative respectively of some of said component image colors, means coupling the output of said sampling apparatus and the output of said receiving means in a manner to subtract said derived video signal components from said received wave, thereby producing another video signal component representative of another component color of said image, and means including image-reproducing apparatus responsive, respectively, to said video signal components for reproducing said image substantially in its natural colors.

References Cited in the file of this patent

UNITED STATES PATENTS

| | | |
|---|---|---|
| 2,545,325 | Weimer | Mar. 13, 1951 |
| 2,559,843 | Bedford | July 10, 1951 |
| 2,657,253 | Bedford | Oct. 27, 1953 |

OTHER REFERENCES

"A Six-Megacycle Compatible High-Definition Color Television System," Radio Corp. of America, FCC Docket Nos. 8736 and 8975, Sept. 26, 1949.

Ser. No. 251,004, Valensi (A. P. C.), published July 13, 1943.